3,394,757
ALTERING BELOW GROUND SURFACE EXISTING CONDITION BY CONTACTING WOODY SUBSTANCE WITH AMMONIA
Henry B. Fisher, Bartlesville, Okla., assignor to Phillips Petroleum Company, a corporation of Delaware
No Drawing. Filed May 27, 1966, Ser. No. 553,273
7 Claims. (Cl. 166—30)

ABSTRACT OF THE DISCLOSURE

An existing condition below the surface of the ground is altered by putting at the place of said condition a woody substance in contact with ammonia. Softening or plasticizing of a woody substance using liquid ammonia and then causing the plasticized woody substance to take a position in the formation below the surface of the ground and then removing the ammonia therefrom to cause the woody substance to harden in the position taken as in sealing a formation against loss of drilling fluid as in the drilling of an oil well is disclosed. A tool such as a drill pipestem made of a woody substance such as wood can be softened by pumping or spotting liquid ammonia thereto at an appropriate place thus facilitating its removal from its jammed condition.

---

This invention relates to altering below ground surface existing conditions. In one of its aspects, the invention relates to sealing formations. In another aspect of the invention, it relates to removal of objects of woody substance from a place below ground surface at which these are blocked or jammed.

Without intending to limit the scope of the appended claims the following is a statement made to acquaint the reader with the general nature of the invention. The invention relates to the method of operating below the surface of the ground at a place at which it is desired to alter an existing condition which comprises putting at the place of said condition a woody substance in contact with ammonia. In more detail, the invention generally contemplates softening or plasticizing a woody substance using liquid ammonia, causing the thus plasticized woody substance to take a position in a formation below the surface of the ground and then removing the ammonia therefrom to cause it to harden in the position taken, for example, as in sealing a formation against loss of drilling fluid as in the drilling of a well.

In the drilling of oil wells large fissures, underground caverns, and very permeable formations are encountered. At these places there can be considerable loss of drilling fluid or drilling mud. Also there can be at these places considerable inflow of water which is undesired. Considerable difficulty and expense is involved in the problems encountered in cutting off flow of fluids as here discussed.

It is known in the art to prevent loss of drilling mud and of circulation thereof by adding various materials such as cottonseed hulls, mica flakes, sawdust or other materials to the mud and circulating the material-laden mud in the bore hole until particles of the material plug or bridge in or on cavities or the porous formation to prevent the further loss of drilling mud thereto. A problem with the use of such materials as here described and with other materials analogously used is that the materials do not suitably coalesce or adhere together to form a mat which will plug a porous formation or sufficiently adhere to the bore hole wall.

It is a concept of the present invention to plasticize a woody substance employing ammonia as a plasticizer or softener which acts below the surface of the ground as in a bore hole or on an adjacent formation or in a fissure or cavernous portion of the formation. It is another concept of the invention to plasticize a woody substance such as wood chips, twigs, logs, etc. and applying liquid ammonia and to pump the plasticized substance into a bore hole up against or into a formation and therein hardening the softened material by removal of the ammonia therefrom. It is a further concept of the invention to plug holes in casings or in tubings by forcing into the holes appropriately sized ammonia plasticized twigs or other pieces of a woody substance and subsequently washing away the ammonia. It is a further concept of the present invention to seal off a water producing formation encountered in air drilling operations by pumping against the face of the formation a mixture of sawdust and liquid ammonia and then following with fresh water to remove the ammonia thus setting the plastic sawdust into a rigid mass in the face of the formation. It is a still further concept of the present invention to soften a tool such as a drill pipe stem, made of a woody substance such as wood, when it has become stuck or jammed in a bore hole by pumping or spotting liquid ammonia thereto at an appropriate place thus facilitating its removal from its jammed condition.

In one form of the invention, pieces of wood, preferably small pieces such as cuttings, shavings, sawdust, etc. are placed in a tank of liquid ammonia a sufficient length of time for substantially complete penetration and plasticizing to take place. The degree of plasticizing which is preferably effected will depend upon the ultimate use. For example, when pumping down a mass of plasticized wood into a cavern to seal walls thereof the pieces can retain substantially their originial shape but will have a good portion of the outer layer of them plasticized. When plugging a formation face using relatively small pieces, for example, sawdust, it is now preferred to completely plasticize the particles with the liquid ammonia so that a readily penetrating fluid is obtained. The amount of ammonia which is used per unit of woody substance is best determined by mere routine testing for each particular end result desired. Ordinarily, the amount of ammonia will be sufficient to at least completely wet the woody substance and to suspend the same therein. Some dilution of the plasticized mass can be practiced, as with water, but at the present time this is not preferred. It is preferred to maintain sufficient ammonia in contact with the plasticized woody substance to permit placing it into the formation or other point of use prior to a hardening thereof.

The invention is based upon the fact that liquid ammonia has a solvency for lignin such that it will turn wood and lignin into a plastic mass which can easily be forced into any desired shape. The final shape is maintained upon removal of the solvent.

It is within the scope of the invention, especially where in certain instances large pieces of plasticized materials are required, to place these into the well before plasticizing. In this kind of operation, the ammonia is pumped into the well and held there a sufficient length of time for plasticizing to occur. Then the ammonia is replaced with drilling mud. In an alternative embodiment, the large piece or pieces can be plasticized externally, then placed into the well and immediately followed by a slug of ammonia to press it into position.

It is within the scope of this invention, also, to apply its technology to the sealing of leaks in underground piping as one skilled in the art having studied this disclosure will readily understand.

The following is an example given simply to illustrate the invention.

*Example*

Plugging of a hole in the casing of a pumping oil well which is not cemented in at the level of this hole and consequently external fluid, namely brine, leaks into the casing and is produced along with the oil is here illustrated. After locating the depth of the hole, by means of a caliper (or other type survey), a perforated tubing with packers at both ends is run into the casing on a tubing and the packers set on either side of the hole in the casing. The hole size is estimated and a water slurry of sawdust of appropriate size range, say, 10 to 30 mesh range for a $\frac{1}{10}''$ diameter hole estimated, is pumped into the casing until a bridge is formed over the hole. Liquid ammonia is then pumped in until the ammonia has contacted the sawdust bridge. The sawdust bridge is plasticized and extruded into the hole. The external brine sets the sawdust plug. After an appropriate time, pressure is released and the ammonia is permitted to evaporate (or is washed out with water) by unsealing the top packer.

When the size of the hole is not known and cannot be estimated readily, then progressively coarser size fractions of sawdust are pumped into the well until bridging is finally accomplished.

The woody substance as the term is used herein and in the claims is intended to include those substances which can be plasticized employing ammonia. These include wood chips, twigs, logs, sawdust and other materials related to wood which can be plasticized with ammonia. One skilled in the art will understand that the concepts of invention herein expressed simply make use of the known fact that ammonia will plasticize woody substances or lignin. Accordingly, herein and in the claims, the interpretation of the term "woody substance" should be taken to include such substances.

Reasonable variation and modification are possible within the scope of the foregoing disclosure and the appended claims to the invention, the essence of which is that ammonia is used to plasticize a woody substance for use below the surface of the ground and that where desired such plasticized substance can be hardened upon mere removal of the ammonia therefrom at the place at which said substance is desired to be hardened.

I claim:

1. A method of operating below surface of the ground in which it is desired to alter an existing condition which comprises putting at the place of said condition a woody substance in contact with liquid ammonia to plasticize said substance.

2. A method according to claim 1 wherein the condition is that the formation of the earth at said place permits undesirable fluid flow and the formation is treated with a woody substance plasticized with liquid ammonia and then the ammonia is removed.

3. A method according to claim 2 wherein the formation is being drilled and permits excessive loss of drilling fluid and there is placed in the formation substantially at the place of said loss a mass of a woody substance plasticized with liquid ammonia and then the ammonia is removed.

4. A method according to claim 2 wherein the formation is cavernous and logs or branched like shaped pieces of a woody substance softened with liquid ammonia are forced against the face of the formation and then the ammonia is removed therefrom thus hardening and fixing said logs or woody substance against the face of the formation.

5. A method according to claim 1 wherein a hole in a tubing in the ground is plugged by pumping to the hole a woody substance plasticized with ammonia and then removing the ammonia.

6. A method according to claim 1 wherein a wooden tool such as a drill pipe is jammed in a well and is disengaged from its jammed condition by treating it with liquid ammonia until at least its surface has been sufficiently softened that it can be moved and then moving said tool.

7. A method of operating below the surface of the ground in which it is desired to alter an existing condition of a woody substance which comprises putting at the place of said woody substance liquid ammonia to plasticize said substance.

References Cited
UNITED STATES PATENTS

| | | | |
|---|---|---|---|
| 57,982 | 9/1866 | Sherwood | 166—37 |
| 2,119,829 | 6/1938 | Parsons. | |
| 2,846,390 | 8/1958 | Lummus et al. | 175—72 X |
| 3,022,248 | 2/1962 | Anderson et al. | 166—42 X |
| 3,231,019 | 1/1966 | Clay et al. | 166—46 X |

OTHER REFERENCES

The Condensed Chemical Dictionary, sixth edition, Reinhold Publishing Corporation, New York, 1961, (pp. 235 and 1008).

STEPHEN J. NOVOSAD, *Primary Examiner.*